Aug. 28, 1945. W. W. PAGET 2,383,499
DRILL MECHANISM
Filed March 2, 1942 2 Sheets-Sheet 1
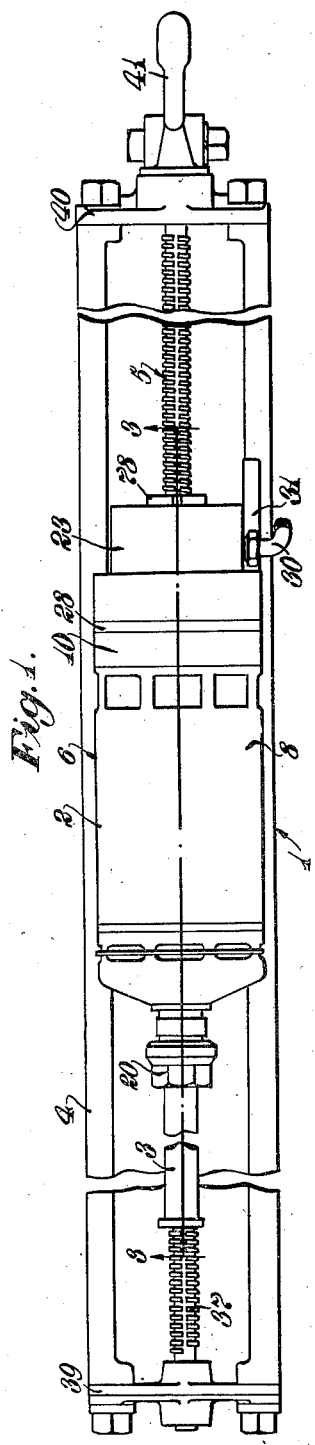
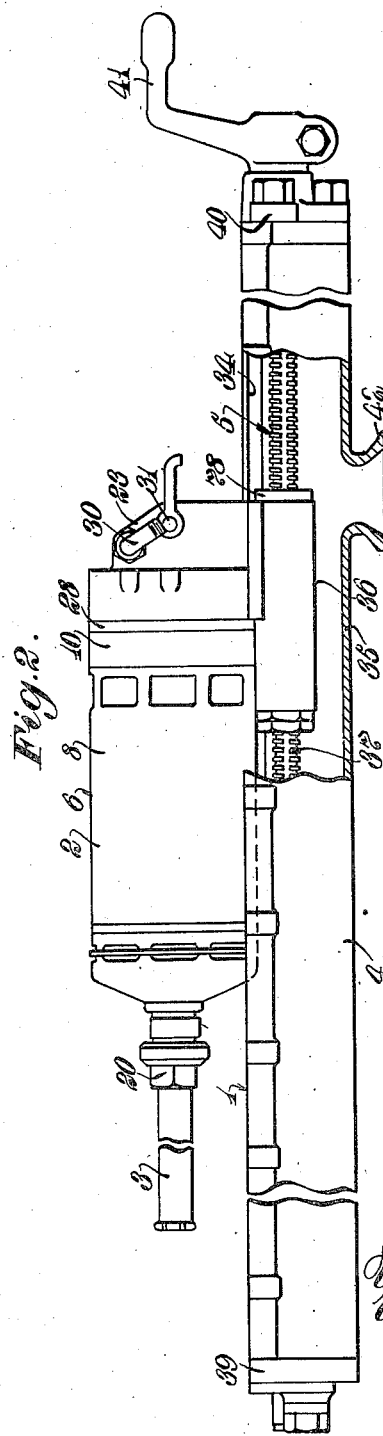
Inventor:
Wm W. Paget.
by
Louis A. Maxson.
Att'y.

Aug. 28, 1945. W. W. PAGET 2,383,499
DRILL MECHANISM
Filed March 2, 1942 2 Sheets-Sheet 2
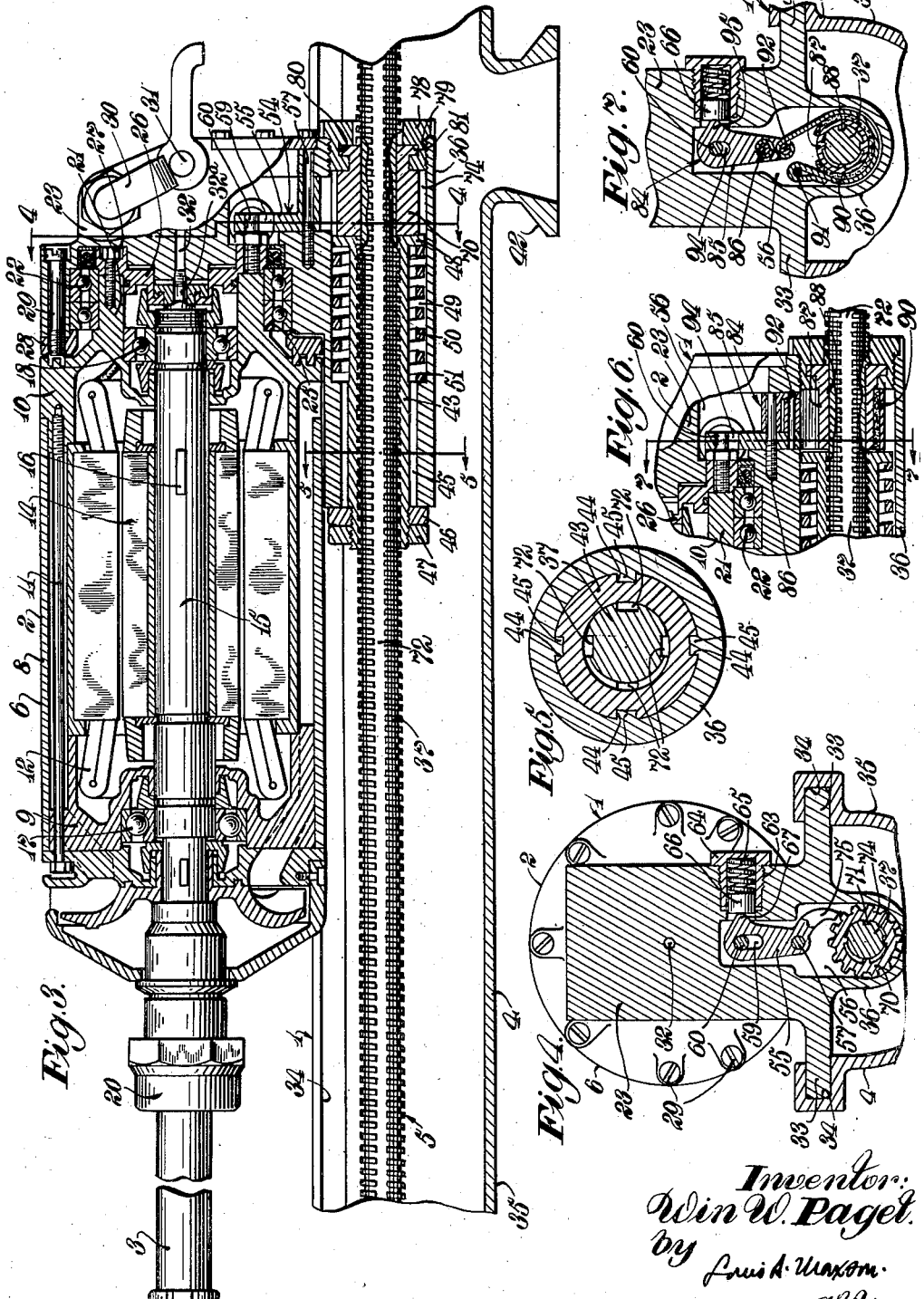
Inventor:
Wm W. Paget.
by Louis A. Maxson.
atty.

Patented Aug. 28, 1945

2,383,499

UNITED STATES PATENT OFFICE 2,383,499

DRILL MECHANISM

Win W. Paget, Michigan City, Ind., assignor to Sullivan Machinery Company, a corporation of Massachusetts Application March 2, 1942, Serial No. 432,951

19 Claims. (Cl. 255—45)

My invention relates to drill mechanisms, and more particularly to feed control means for drill mechanisms of the rotary type.

In the drilling of material by means of a rotary type drill, it is desirable that the drilling tool be subjected to a continuous feeding pressure in order that the maximum efficiency may be obtained. It is also desirable to avoid a subjection of the drill mechanism to sudden changes in load, or a driving of the drilling tool against an excessive resistance to rotation which may cause the tool to be damaged.

By providing means for yieldingly feeding a drilling tool toward its work at pressures which may be increased until the resistance to rotation of the drilling tool reaches a predetermined maximum value, and then preventing further increase in the feeding pressure until the resistance to rotation of the drilling tool has decreased somewhat, there will be obtained a drill mechanism which operates at high efficiencies but is never subjected to excessive loads.

An object of my invention is to provide an improved drill mechanism of the rotary type. Another object is to provide in a drill mechanism of the rotary type, improved means for controlling the feeding of the drill relative to its work. Still another object is to provide improved means for feeding a rotary type drill relative to its work at increasing feeding pressures until the torque load on the drill rotating means reaches a predetermined maximum value and then preventing further increase in feeding pressure. Still another object is to provide improved means for regulating the feeding pressures on a rotary type drill in accordance with the resistance to rotation of the latter. These and other objects and advantages of my invention will, however, hereinafter appear more fully.

In the accompanying drawings there are shown for purposes of illustration one form and a modification which my invention may assume in practice.

In these drawings:

Fig. 1 is a plan view of a drill mechanism having my invention incorporated therein.

Fig. 2 is a side elevational view, with parts broken away, of the drill mechanism shown in Fig. 1.

Fig. 3 is an enlarged longitudinal vertical sectional view taken on the line 3—3 of Fig. 1.

Fig. 4 is a vertical cross sectional view taken on the line 4—4 of Fig. 3.

Fig. 5 is an enlarged cross sectional view taken on the line 5—5 of Fig. 3.

Fig. 6 is a detail sectional view taken in the plane of Fig. 3 and showing a modification of the feed control means.

Fig. 7 is a cross sectional view taken on the line 7—7 of Fig. 6.

In the drawings, there is shown a drill mechanism, generally designated 1, comprising a power unit 2 arranged to rotate a drilling tool 3 and mounted for reciprocation on a supporting and guiding shell 4. A feed mechanism, generally designated 5, is provided for feeding the power unit along the supporting and guiding frame 4 relative to the work.

The power unit 2 is shown herein as an electric motor 6 having a casing 8 and front and rear motor heads 9 and 10 secured to the ends of the casing as by tie bolts 11. Arranged within the motor casing is a stationary field winding 12 and an armature rotor 14 fixed to a power shaft 15, as by a key 16. The power shaft is rotatably supported in the front and rear motor heads by bearings 17 and 18, and has fixed to its forward end a chuck 20 for receiving the drilling tool 3. Formed integrally with the rear motor head 10 is a rearwardly extending projection 21 rotatably supported in bearings 22 carried by a rear head block 23. The inner races of the bearings 22 are clamped between a shoulder 25 on the projection 21 and an annular member 26 attached to the rear end of the projection 21, as by bolts 27. The outer races of the bearings 22 are held securely within an annular recess in the rear head block by a ring 28 attached to the head block by bolts 29. The projection 21 is held, by means which will be shortly described, against rotation in the bearings 22 during normal loads on the motor, but is permitted to turn slightly at a predetermined maximum load on the motor for effecting a control of the feeding of the latter. Cleansing liquid is supplied through a connection 30 under the control of a manually operated valve 31 to a passage 32 extending through the head block 23 into communication with a liquid supply tube 32ª extending through the power shaft 15 and through which liquid is supplied on its way to the drilling tool 3 and to the bottom of the drill hole.

The rear head block 23 is provided, as shown in Fig. 4, with laterally projecting flanges 33 fitting within guideways 34 in a troughlike portion or member 35 of the supporting and guiding shell 4. Depending from the lower side of the rear head block is a bosslike portion 36 extending within the trough-like member 35. A feed screw 37 extends longitudinally within the trough of the member 35 and through the bosslike portion 36, and is rotatably supported in plates 39 and 40 attached to the front and rear ends of the member 35. Any suitable means, such as an operating handle 41, may be provided for rotating the feed screw 37. Formed integrally with the troughlike member 35 is a projecting portion 42 adapted to be clamped in a suitable mounting for holding the member 35 in the desired drill-supporting position.

Arranged within the bosslike portion 36 is a feed nut 43 threadedly engaging the feed screw 37, and having grooves 44 in its outer surface extending in the same direction as the feed screw and receiving flanges 45 on the portion 36. The flanges 45 have a sliding fit within the grooves 44 so that the feed nut and the rear head block may move relative to each other longitudinally of the feed screw but are held against relative angular movement. A nut 46 is threaded upon the reduced forward end of the feed nut and is engageable with the forward end of the bosslike portion 36 for limiting the rearward movement of the feed nut relative to the rear head block. A lock nut 47 threaded on the front end of the feed nut holds the nut 46 in position. The rear end of the feed nut is provided with an enlarged head 48 fitting loosely within a chamber 49 in the depending portion 36. Arranged within the chamber 49 is a coiled spring 50 surrounding the body of the feed nut and acting against the front end wall 51 of the chamber 49 and the inner surface of the head 48 on the feed nut for urging the latter to the right, as viewed in Fig. 3.

In order to feed the drill relative to its work it is only necessary to rotate the feed screw 37 so as to cause the feed nut 43 to travel along the feed screw. As the feed nut is caused to travel forwardly along the feed screw, the enlarged head 48 on the feed nut acts against the spring 50 and forces the latter against the wall 51 for moving the rear head block 23 along the member 35 toward the work. To prevent an increase in the forward feeding pressure on the drill when the load on the drill motor reaches a predetermined maximum value there is provided a locking mechanism, generally designated 54, for locking the feed screw 37 against rotation. It will be seen that when the feed screw is locked against rotation, the spring 50 will continue to urge the drill motor forwardly but with a gradually decreasing feeding pressure as the drilling tool cuts its way into the material. When the resistance to rotation of the drilling tool is reduced somewhat, the locking mechanism 54 releases the feed screw so that the latter may be rotated for effecting forward movement of the feed nut to build up the feeding pressure again. The drill is fed rearwardly along the guide member 35 by rotating the feed screw in a direction to cause the feed nut 43 to travel rearwardly along the screw. When the nut 46 on the forward end of the feed nut engages the front end of the depending portion 36, the head block 23 with the drill motor attached is moved rearwardly along the guide member on continued rearward movement of the feed nut.

The locking mechanism 54 is adapted to be actuated by a rotary movement of the drill motor casing relative to the rear head block 23. This locking mechanism comprises, as shown in Figs. 3 and 4, a latch 55 arranged within a chamber 56 in the head block 23 and pivotally mounted between its ends on a pin 57. The pin 57 extends through the chamber parallel to the feed screw and is supported at its ends within the head block. Extending through the upper portion of the latch is a slot 59 for receiving a pin 60 threaded into an opening in the annular member 26 attached to the projection 21 on the rear motor head 10. Threaded into an opening 63 extending through the side of the head block 23 into the upper end of the chamber 56 is a plug 64 supporting a spring 65 for urging a plunger 66 inwardly through the opening into engagement with a lateral projection 67 formed on the latch. The feed screw extends through the lower portion of the chamber 56, and surrounding the feed screw within this portion of the chamber is a sleeve member 70 having inner radially extending projections 71 slidably fitting within grooves 72 in the feed screw. Formed in the outer surface of the sleeve member 70 are grooves 74 extending longitudinally of the feed screw and adapted to receive a lower hooked portion 75 of the latch 55 when it is swung in a clockwise direction, as viewed in Fig. 4, about its pivot pin 57. In order to hold the sleeve member in a position beneath the latch 55, there is provided a split head 78 threaded into an opening 79 in the rear end of the boss portion 36 and having an annular groove 80 receiving a radially extending annular flange 81 on the rear end of the sleeve member.

During normal loads on the drill motor, the rear motor head 10 is held against rotation in the bearings 22 relative to the rear head block 23 by the spring pressed plunger 66 acting through the upper portion of the latch 55 against the pin 60. At the same time the latch 55 is held in a position so that its lower hooked portion is released from the grooves 74, and the feed screw is free to rotate. On operating the handle 42 to rotate the feed screw in a forward feeding direction, the feed nut 43 is caused to travel forwardly along the feed screw and force the spring 50 against the depending boss 36 for moving the drill motor toward the material to be drilled. If the load on the drill motor increases to a point where the rear motor head is caused to rotate in the bearings 22 against the force exerted by the spring 65, then the latch 55 will be caused to swing about its pivot pin 57 until the lower hooked portion of the latch engages one of the grooves 74 in the sleeve member 70 and locks the feed screw against further rotation. The drill motor continues to be urged by the spring 50 in a forward feeding direction until the nut 46 on the forward end of the feed nut is engaged by the front end of the bosslike portion 36. As soon as the load on the drill motor decreases to a point where the spring 65 causes the rear motor head to turn in a clockwise direction, as viewed in Fig. 4, the latch 55 is released from the grooves 74 in the sleeve member 70 and the feed screw is freed for rotation.

A modification of the feed screw locking means is shown in Figs. 6 and 7. The parts of the drill mechanism, other than the locking means, are the same as those described above and will be given like reference numerals. The feed screw locking means, generally designated 84, comprises an arm 85 arranged within the chamber 56 and pivotally mounted between its ends on a pin 86 extending through the chamber parallel to the feed screw 37. Surrounding the portion of the feed screw extending through the chamber 56 is a sleeve member 87 having inwardly projecting portions 88 slidably fitting within the grooves 72 in the feed screw. Extending part way around the sleeve member 87 is a flexible friction band 90 having one of its ends fixed to a pin 91 attached to the head block 23, and having its other end connected to a pin 92 carried by the lower end of the arm 85. At the upper end of the arm 85 is a slot 94 receiving the pin 60 projecting rearwardly from the rear motor head 10. A lateral projection 95 on the upper portion of the arm 85 is engaged by the spring pressed plunger 66 for holding the rear motor head against rotation in the bearings 22 during normal motor loads, and for holding the arm 85 in a position to release the brake band 90 from the outer surface of the sleeve member 87. At a predetermined maximum load on the drill motor, the rear motor head 10 is caused to rotate relative to the rear head block and swing the arm 85 about its pivot against the action of the spring pressed plunger 66, pulling the brake band 90 about the sleeve member 89 for braking the rotation of the feed screw.

As a result of this invention there are provided improved means for controlling the feeding of a drilling tool relative to its work. It will be noted that the forward feeding pressure on the drilling tool may be gradually increased until the load on the drill motor reaches a predetermined maximum value. When the maximum desired load on the drill motor has been reached the feed mechanism is automatically locked to prevent a further increase in the forward feeding pressure. By reason of the yielding means through which the forward feeding pressure is transmitted to the drilling tool, a feeding pressure is maintained on the drilling tool even after the feed mechanism is locked. As the load on the motor decreases, the feeding mechanism is automatically released to permit a building up of the feeding pressure again. Due to the subjection of the drilling tool to continuous feeding pressure, sudden strains on parts of the drill mechanism are prevented and an improved efficiency of operation is obtained.

While I have in this application specifically described one form and a modification which my invention may assume in practice, it will be understood that this form and modification are shown for purposes of illustration, and that the invention may be further modified and embodied in various other forms without departing from its spirit or the scope of the appended claims.

What I claim as new and desire to secure by Letters Patent is:

1. In a drilling apparatus, in combination, means for rotating a drilling implement for causing the same to effect its drilling function including an implement-rotating motor, means for feeding a drilling implement which is rotated by said implement-rotating motor into the work during drilling, said feeding means including elements cooperating on relative movement to provide a feeding force and a yieldable element through which feeding pressures are delivered to the implement during drilling, said yieldable element having a portion thereof so operatively related to the implement to be fed, during drilling, that forward movements of such portion and of the drilling implement as the latter is fed are simultaneous and equal in extent, and means responsive to the torque loads on said implement rotating means and operative at a predetermined maximum torque load for automatically preventing further increase in the feeding pressures transmitted through said yieldable element to the implement for precluding the application of an excessive feeding pressure to the implement.

2. In a drilling apparatus, in combination, means for rotating a drilling implement for causing the same to effect its drilling function including an implement-rotating motor, means for feeding a drilling implement which is rotated by said implement-rotating motor into the work during drilling, said feeding means including elements cooperating on relative movement to provide a feeding force and yieldable means for transmitting the feeding pressures to the drilling implement during drilling, said yieldable means having a portion thereof so operatively related to the drilling implement, during drilling, that forward movements of such portion and of the drilling implement as the latter is fed are simultaneous and equal in extent, and means responsive to the torque-loads on said implement-rotating means for automatically limiting the feeding pressures transmitted through said yieldable means to the implement for precluding the application of an excessive feeding pressure to the implement.

3. In a drill mechanism, in combination, a motor for rotating a drilling tool, means supporting and guiding said motor for movement relative to material to be drilled, means for feeding said motor along said supporting and guiding means, a yieldable element through which a forward feeding pressure is transmitted to said motor, and means responsive to the torque loads on said motor and operative at a predetermined maximum torque load on the latter for preventing an increase in the feeding pressure transmitted through said yieldable element.

4. In a drill mechanism, in combination, a motor for rotating a drilling tool, means supporting said motor for bodily movement relative to material to be drilled and for limited rotary movement relative to said supporting means, means for feeding said motor relative to the material to be drilled, yieldable means for transmitting the feeding pressure to said motor, and means actuated by the rotary movement of said motor on said supporting means for limiting the feeding pressure applied to said motor transmitted through said yieldable transmitting means.

5. In a drill mechanism, in combination, a motor for rotating a drilling tool, means supporting said motor for bodily movement relative to material to be drilled and for limited rotary movement relative to said supporting means, means for feeding said motor relative to the material to be drilled, a yieldable element through which a feeding pressure is transmitted to said motor, and means actuated by the rotary movement of said motor on said supporting means for controlling the feeding pressures transmitted through said yieldable element to said motor.

6. In a drill mechanism, in combination, a motor for rotating a drilling tool, means supporting said motor for bodily movement relative to material to be drilled and for limited rotary movement relative to said supporting means, means for feeding said motor relative to the material to be drilled, a yieldable element through which a feeding pressure is transmitted to said motor, and means actuated by the rotary movement of said motor on said supporting means at a predetermined maximum motor load for preventing an increase in the feeding pressure transmitted through said yieldable element.

7. In a drilling apparatus, in combination, means for rotating a drilling implement for causing the same to effect its drilling function including an implement-rotating motor, means for feeding a drilling implement which is rotated by said implement-rotating motor toward the work during drilling including relatively rotatable feeding elements cooperating on relative rotation to provide a feeding force and yieldable means for transmitting feeding pressures to the implement on relative rotation of said feeding elements, said yieldable means having a portion thereof so operatively related to the implement to be fed, during drilling, that forward movements of such portion and of the drilling implement as the latter is fed are simultaneous and equal in extent, and means responsive to the torque loads on said motor for automatically controlling the relative rotation of said feeding elements for precluding the transmission of an excessive feeding pressure through said yieldable means to the implement.

8. In a drill mechanism, in combination, a motor for rotating a driling tool, means supporting and guiding said motor for movement relative to material to be drilled, means including relatively rotatable elements for feeding said motor along said supporting and guiding means, yielding means for transmitting feeding pressure to said motor on relative rotation of said elements, means for rotating one of said relatively rotatable elements, and means operative at a predetermined maximum load on said motor for locking the last mentioned one of said elements against rotation.

9. In a drill mechanism, in combination, a motor for rotating a drilling tool, means supporting and guiding said motor for bodily movement relative to material to be drilled, means for feeding said motor along said supporting and guiding means, said feeding means including a feed nut operatively connected to said motor for rectilinear movement relative to the latter, a feed screw threadedly engaging said feed nut and means for rotating said feed screw, yielding means between said motor and said feed nut for resisting rectilinear movement of said feed nut in a forward direction relative to said motor, and means operative at a predetermined load on said motor for locking said feed screw against rotation.

10. In a drill mechanism, in combination, a motor for rotating a drilling tool, means supporting and guiding said motor for bodily movement relative to material to be drilled, said supporting and guiding means permitting relative angular movement of said motor at predetermined loads on the latter, means for feeding said motor along said supporting and guiding means, said feeding means including a feed nut operatively connected to said motor for rectilinear movement relative to the latter, a feed screw threadedly engaging said feed nut and means for rotating said feed screw, yielding means for transmitting feeding pressure from said feed nut to said motor, and means operative on the angular movement of said motor at a predetermined maximum load for locking said feed screw against rotation.

11. In a drill mechanism, in combination, a motor for rotating a drilling tool, means supporting and guiding said motor for bodily movement relative to material to be drilled, said supporting and guiding means permitting relative angular movement of said motor at predetermined loads on the latter, means for feeding said motor along said supporting and guiding means, said feeding means including a feed nut operatively connected to said motor for rectilinear movement relative to the latter, a feed screw threadedly engaging said feed nut and means for rotating said feed screw, and means operative on the rotation of said motor at a predetermined maximum load for locking said feed screw against rotation, said feed screw locking means including a latch operatively connected to said motor and mounted for pivotal movement relative to the latter, and a member fixed against angular movement relative to said feed screw and adapted to be engaged by said latch on pivotal movement of the latter for locking said feed screw against rotation.

12. In a drilling mechanism, in combination, means providing a guideway, a drilling motor mounted for sliding movement on said guideway-providing means, relatively rotatable members, one movable along said guideway with the drilling motor and one mounted on said guideway-providing means, for effecting feeding of said drilling motor along said guideway on relative rotation between them, a yielding pressure-transmitting connection between said member movable along said guideway with said drilling motor and said drilling motor, and means governed by the resistance to drilling for precluding relative rotation between said members while resistance to drilling exceeds a predetermined amount.

13. In a drilling mechanism, in combination, means providing a guideway, a drilling motor mounted for sliding movement on said guideway-providing means, relatively rotatable members, one movable along said guideway with the drilling motor and one mounted on said guideway-providing means, for effecting feeding of said drilling motor along said guideway on relative rotation between them, means yieldably connecting the one of said members which is movable with said drilling motor with the latter providing for relative movement between said motor and said member in a direction longitudinal of said guideway, and means governed by the resistance to drilling for precluding relative rotation between said members while resistance to drilling exceeds a predetermined amount, said last mentioned means including a lock for locking against rotation the rotatable one of said members.

14. In a drilling mechanism, in combination, means providing a guideway, a drilling motor mounted for sliding movement on said guideway-providing means, relatively rotatable members, one movable along said guideway with the drilling motor and one mounted on said guideway-providing means, for effecting feeding of said drilling motor along said guideway on relative rotation between them, means yieldably connecting the one of said members which is movable with said drilling motor with the latter providing for relative movement between said motor and said member in a direction longitudinal of said guideway, and means governed by the resistance to drilling for precluding relative rotation between said members while resistance to drilling exceeds a predetermined amount, said last mentioned means including a lock movable bodily with said drilling motor during feeding for locking against rotation the rotatable one of said members.

15. In a drilling mechanism, in combination, a motor for rotating a drilling tool, means supporting said motor for bodily movement relative to the material to be drilled, means for mounting said motor for limited yielding movement relative to said supporting means, means for feeding said motor relative to the material to be drilled, yieldable means other than said yielding mounting means for transmitting the feeding pressure to said motor, and means actuated by the limited yielding movement of said motor on its mounting means relative to said supporting means for limiting the feeding pressure imposed on said motor through said yieldable transmitting means.

16. In a drilling apparatus, in combination, means for actuating a drilling implement to cause the same to effect its drilling function, feeding force providing means for feeding a drilling implement actuated by said implement-actuating means toward the work during drilling, means providing a yielding connection between said feeding force providing means and the implement for yieldingly transmitting the feeding pressures to the implement, said means providing a yielding connection having a portion thereof so operatively related to the implement to be fed, during drilling, that forward movements of such portion and of the drilling implement as the latter is fed are simultaneous and equal in extent, motion-checking means for regulating the feeding pressures transmitted by said feeding force providing means through said yielding connection to the implement, and means responsive to the load changes on the implement for automatically regulating said motion-checking means to limit the feeding pressures transmitted to the implement through said yielding connection for precluding the application of an excessive feeding pressure to the implement.

17. In a drilling apparatus, in combination, means for actuating a drill bit, feeding force providing means for a drill bit actuated by said actuating means including relatively rotatable coacting feeding elements, means providing a yielding connection advanced with the bit during forward feeding and between said feeding force providing means and the drill bit which is fed thereby whereby the feeding pressures are yieldingly transmitted to the drill bit, said yielding connection providing means having a portion thereof so operatively related to the drill bit, during drilling, that forward movements of such portion and of the drill bit as the latter is fed are simultaneous and equal in extent, and means automatically responsive to torque-load changes on said bit actuating means for regulating the rate of relative rotation between said feeding elements to vary the feeding pressures transmitted to said yielding connection.

18. In a drilling apparatus, in combination, means for actuating a drilling instrumentality for causing the same to effect its drilling function, feeding force providing means for applying feeding pressures to a drilling instrumentality for urging the latter toward the work as drilling proceeds, yielding-pressure-transmitting means moved bodily in the feeding direction to effect feeding and whereby the feeding pressures are yieldingly applied to said drilling instrumentality, said yielding pressure transmitting means having a portion thereof so operatively related to the instrumentality to be fed, during drilling, that forward movements of such portion and of the drilling instrumentality as the latter is fed are simultaneous and equal in extent, and means for regulating said feeding force providing means to limit the feeding pressures applied to such instrumentality through said yieldable-pressure-transmitting means automatically in accordance with torque load changes on the instrumentality for precluding the application of an excessive feeding pressure to the instrumentality.

19. In a drilling apparatus, in combination, means for actuating a drilling instrumentality for causing the same to effect its drilling function, feeding force providing means for applying feeding pressures to a drilling instrumentality actuated by said actuating means for urging such instrumentality toward the work as drilling proceeds, means advancing with the drilling instrumentality during feeding for yieldingly transmitting the feeding pressures from said feeding force providing means to the instrumentality, said means for yieldingly transmitting the feeding pressures having a portion thereof so operatively related to the instrumentality to be fed, during drilling, that forward movements of such portion and of the drilling instrumentality as the latter is fed are simultaneous and equal in extent, and means responsive to torque load changes on the instrumentality for automatically varying the effectiveness of said feeding means whereby the feeding pressures transmitted to the instrumentality through said yielding transmitting means are automatically limited.

WIN W. PAGET.